(12) United States Patent
Page, Jr.

(10) Patent No.: US 7,747,479 B2
(45) Date of Patent: Jun. 29, 2010

(54) METHOD, DEVICES AND STORAGE MEDIA FOR MANAGING INVENTORY

(75) Inventor: Joseph E. Page, Jr., Suwanne, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 926 days.

(21) Appl. No.: 11/252,113

(22) Filed: Oct. 17, 2005

(65) Prior Publication Data
US 2007/0088632 A1 Apr. 19, 2007

(51) Int. Cl.
G06Q 10/00 (2006.01)

(52) U.S. Cl. .................. 705/28; 235/385; 340/10.5; 340/10.6; 705/7; 705/9; 705/22; 705/29; 707/8; 707/10; 707/102; 700/102; 700/105; 700/106; 700/107

(58) Field of Classification Search .................. 705/28
See application file for complete search history.

(56) References Cited

U.S. PATENT DOCUMENTS

| | | | |
|---|---|---|---|
| 4,961,533 A * | 10/1990 | Teller et al. ............... 177/25.19 |
| 5,671,362 A * | 9/1997 | Cowe et al. .................. 705/28 |
| 5,774,876 A * | 6/1998 | Woolley et al. ............... 705/28 |
| 5,798,693 A * | 8/1998 | Engellenner ............. 340/10.33 |
| 5,864,875 A * | 1/1999 | Van Huben et al. ......... 707/200 |
| 6,341,271 B1 * | 1/2002 | Salvo et al. .................. 705/28 |
| 2006/0080189 A1 * | 4/2006 | Takahashi et al. ............. 705/28 |

OTHER PUBLICATIONS

The Industry's Largest Newsletter for Surface Mount Technology & electronic Packaging Professionals. SMT Trends, p. 1, Nov. 1998.*

* cited by examiner

Primary Examiner—F. Zeender
Assistant Examiner—Fawaad Haider
(74) Attorney, Agent, or Firm—Cantor Colburn LLP

(57) ABSTRACT

A device for managing inventory, such as tools and equipment, includes a user interface in operable communication with a processor and a storage medium; a transceiver in operable communication with an antenna and the processor, the transceiver operable for communicating with a tool or a piece of equipment; and a notification device in operable communication with the processor. The processor determines if the tool or the piece of equipment is within a specified range of the device for managing tool and equipment inventory.

10 Claims, 3 Drawing Sheets

METHOD, DEVICES AND STORAGE MEDIA FOR MANAGING INVENTORY

BACKGROUND

The present invention relates generally to a device for managing inventory. More specifically, the present invention relates to an electronic device that alerts a user if inventory is not present with a designated range.

Currently, radio frequency identification (RFID) devices/chips are being used for pet identification, toll collection on the highways and in automotive systems. Future applications include supply chain management and inventory tracking from high end clothing stores to factory floor assembly lines.

These RFID chips are far superior to conventional bar code technology, which is limited due to line of sight requirements for bar code systems. RFID chips currently available from several manufactures including Philips Semiconductor and Texas Instrument are extremely fast and accurate with operating frequencies of approximately 13.56 MHz to approximately 2.46 GHz. The RFID chips also provide for read distances of about five feet to about ten feet.

Currently, a large number of portable tools and hand held tools for manufacturing and repair purposes utilize RFID chips. The tools are generally stored in one facility and are then checked out to an individual. The individual then takes the tools to use in various locations. The user may take multiple pieces of equipment and tools to a particular job site. It is often the case that the user may inadvertently leave a tool or piece of equipment at one of many job sites visited, and the task of locating the tool or equipment becomes very difficult, especially when the user visits multiple job sites in a single trip.

Accordingly, there is a need to provide a highly reliable and efficient system, which provides the user with a warning that they are about to leave a tool or piece of equipment. Ideally, the system should incorporate state of the art electronics including microchips that operate using radio frequency identification technology.

SUMMARY

Exemplary embodiments include a device for managing tool and equipment inventory including: a user interface in operable communication with a processor and a storage medium; a transceiver in operable communication with an antenna and the processor, the transceiver operable for communicating with inventory; and a notification device in operable communication with the processor, wherein the processor determines if the inventory is within a specified range of the device for managing inventory.

Exemplary embodiments also include a computer program product for managing inventory, the computer program product including: a storage medium readable by a processing circuit and storing instructions for execution by the processing circuit for facilitating a method including: detecting the presence of the inventory within a specified range of the device for managing inventory; and alerting a user to the absence of the inventory within the specified range of the device for managing inventory.

Further exemplary embodiments include a method for managing tool and equipment inventory including: associating an inventory with a device for managing inventory; detecting the presence of the inventory within a specified range of the device for managing inventory; and alerting a user to the absence of the inventory within the specified range of the device for managing inventory.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION

Figure 1:
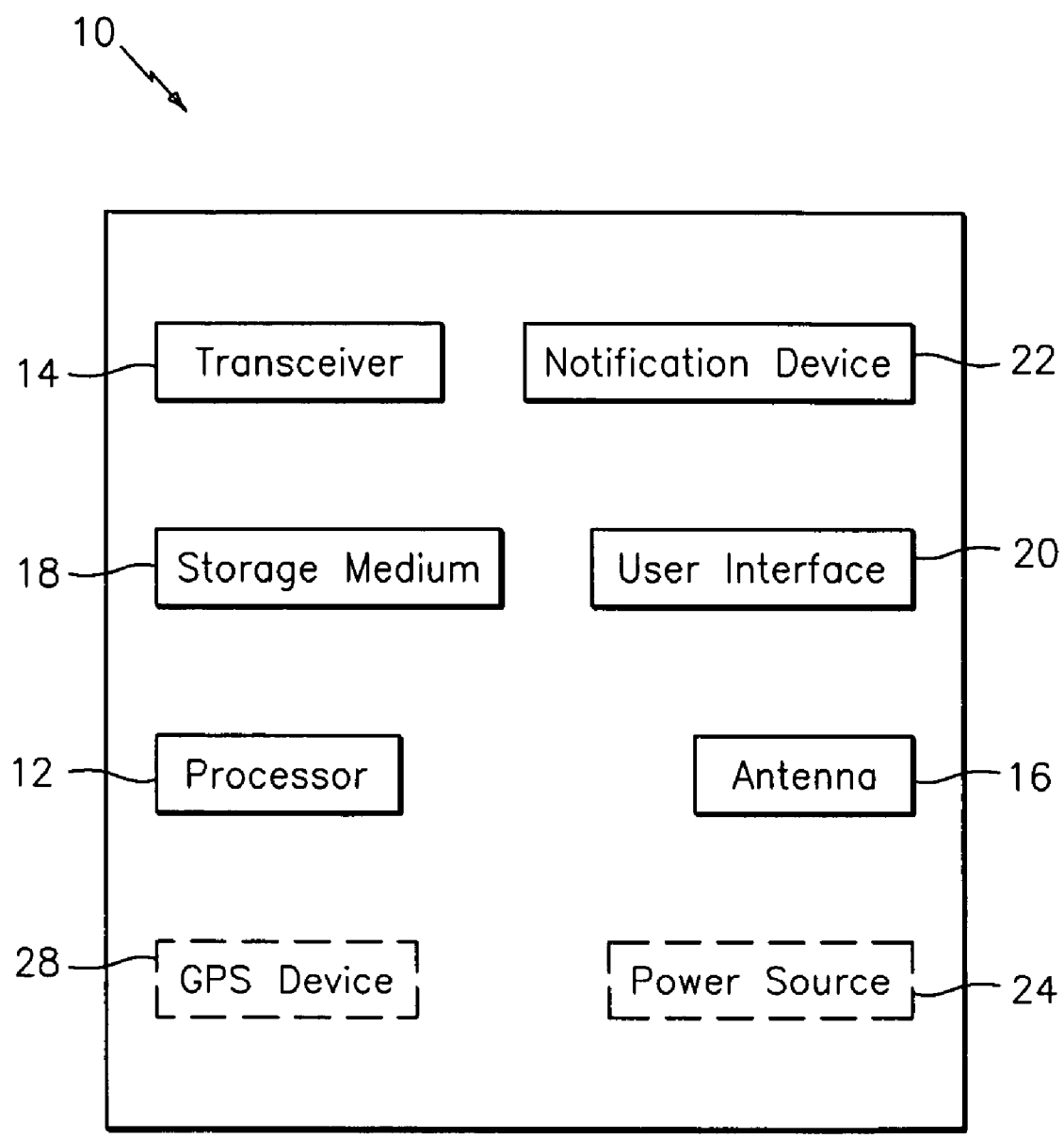
FIG. 1 illustrates a block diagram of an exemplary embodiment of a device for managing inventory.

Referring to FIG. 1, a block diagram of an exemplary embodiment of a device for inventory is depicted generally as 10. While the example described below is directed to managing tool and equipment inventory, it should be appreciated that the invention is not so limited, but that it may be applicable for managing other types of inventory. The device 10 for managing tool and equipment inventory includes a processor 12, a transceiver 14, an antenna 16, a storage medium 18, a user interface 20, and a notification device 22. Additionally, the device for managing tool and equipment inventory 10 may also include a power source 24 and a GPS device 28. The processor 12 is in operable communication with the transceiver 14, the storage medium 18, the user interface 20, and the notification device 22.

In exemplary embodiments, the user interface 20 is operable for receiving user input and allows a user to associate a tool or piece of equipment with the device 10 for managing tool and equipment inventory. The user interface 20 may include a display portion and a separate input portion; alternatively the user interface 20 may include a single portion that incorporates both display and input functions, such as a touch screen display. The user interface 20 may include, but is not limited to, a keyboard, a CRT display, a LCD display, an EL display, a trackpad, a stylus, or any other suitable device. The storage medium 18 may be implemented using a variety of devices for storing electronic information. Likewise, the processor 12 may also be implemented using a variety of devices for processing electronic information. Processor 12 implements processes described herein in response to computer program code contained in storage medium 18.

The transceiver 14 is operable for communicating with tools and equipment within a specific range of the device 10 for managing tool and equipment inventory. In exemplary embodiments the transceiver 14 uses RF signals to communicate with tools and equipment that include RFID tags. In alternative exemplary embodiments, the transceiver 14 may include a separate transmitter and receiver. The transceiver 14 may operate on a specific frequency or may be capable of operating across a wide range of frequencies. The antenna 16 is in operable communication with the transceiver 14 and is utilized to facilitate communication between the transceiver 14 and the tools or pieces of equipment. The antenna 16 may be any suitable antenna type, including, but not limited to, dipole, monopole, patch, bicone, monocone, notch, horn, or reflector antenna. The specified range, which the device 10 for managing tool and equipment inventory is able to communicate with tools and equipment, may be a function of the type of antenna used as well as the power available to the device 10.

The notification device 22 may include, but is not limited to, an audible alarm or a visual indicator. The visual indicator may be incorporated into the user interface 20 or may be a separate device such as an LED. In exemplary embodiments, the notification device 22 may be in operable communication with the GPS device 28. Additionally, the device for managing tool and equipment inventory 10 may keep an activity log of the notification device 22 in the storage medium 18. The activity log may include a list of each notification of a missing tool or piece of equipment and an approximate last known location of the tool or piece of equipment based on the GPS device 28.

Figure 2:
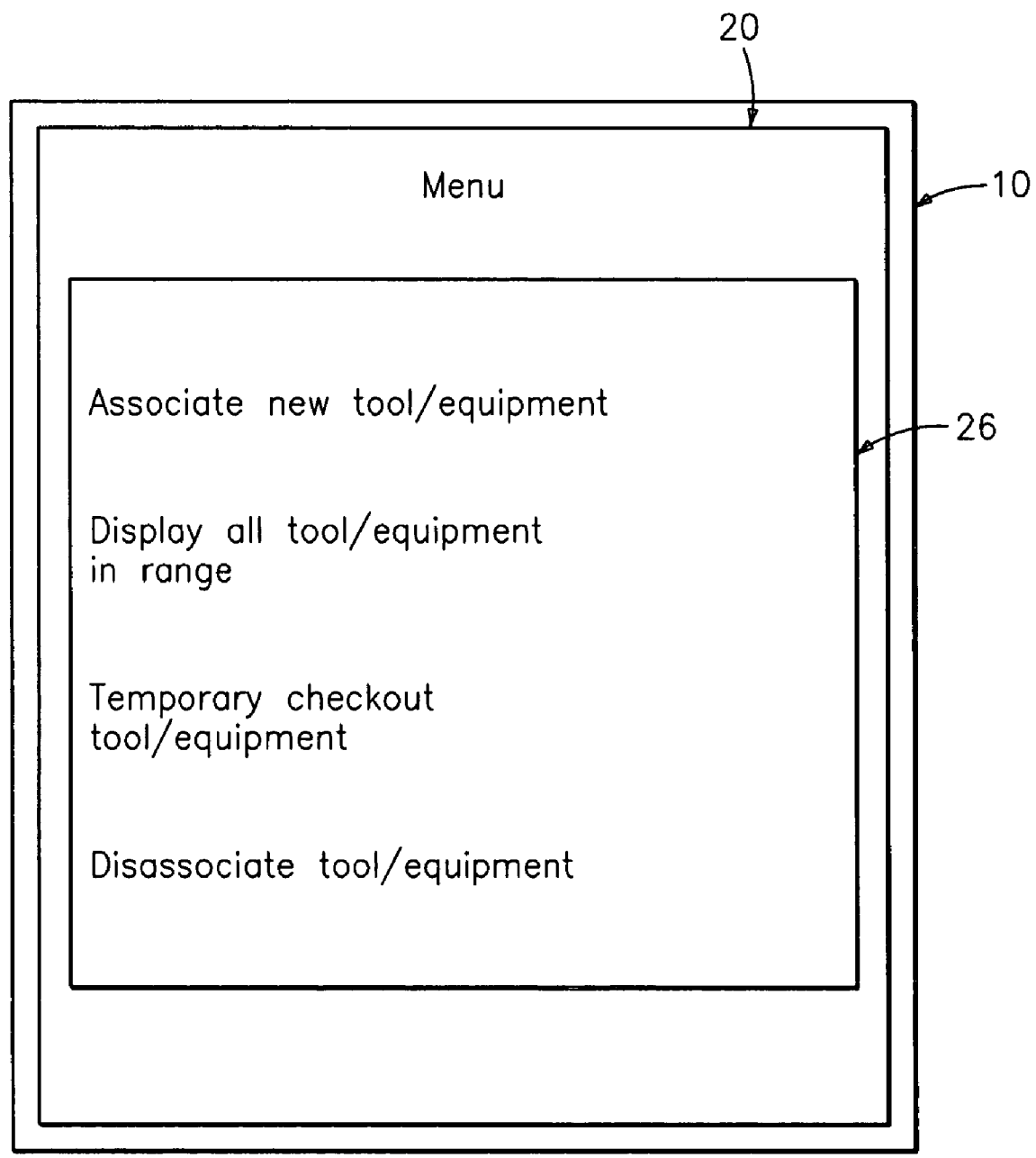
FIG. 2 illustrates an exemplary embodiment of a user interface for managing inventory.

Turning now to FIG. 2, an exemplary embodiment of a user interface of a device for managing tool and equipment inventory is depicted. The user interface 20 may display a menu 26 of actions including, e.g., associate new tool/equipment, display all devices in range, temporary checkout tool/equipment, and disassociate tool/equipment. In order to associate a new tool or piece of equipment with the device 10 for managing tool and equipment inventory, the user would select the associate new tool/equipment action from the menu 26. The device 10 for managing tool and equipment inventory would then list the tools/equipment that are detected and are not currently associated with the device, and the user would select the tool/equipment to be associated. Upon selecting all devices in range from the menu 26, the device 10 for managing tool and equipment inventory will display, via the user interface, a list of all devices within range of the device 10. Additionally, the list of all the devices may include an indication of which devices are currently associated with the device 10.

The temporary checkout tool/equipment option of the menu 26 allows a user to remove a selected tool or piece of equipment from the specified range of the device 10 for managing tool and equipment inventory without the notification device 22 becoming active. In exemplary embodiments, the user may select a duration that the tool/equipment is being checked-out for, and, if the tool is not returned to the specified range of the device 10 for managing tool and equipment inventory before the duration has expired, the notification device 22 will alert the user. In alternative exemplary embodiments, the device 10 for managing tool and equipment inventory includes a list of tools/equipment that have been temporarily checked-out and may periodically remind the user that there are tools/equipment that have been checked out. Additionally, the menu 26 includes a disassociate tool/equipment option which allows a user to permanently disassociate a tool or piece of equipment from the device 10 for managing tool and equipment inventory. Once the disassociate tool/equipment option is selected, the device 10 for managing tool and equipment inventory may display the list of associated tools and pieces of equipment and allow the user to select the tool or piece of equipment to be disassociated.

Figure 3:
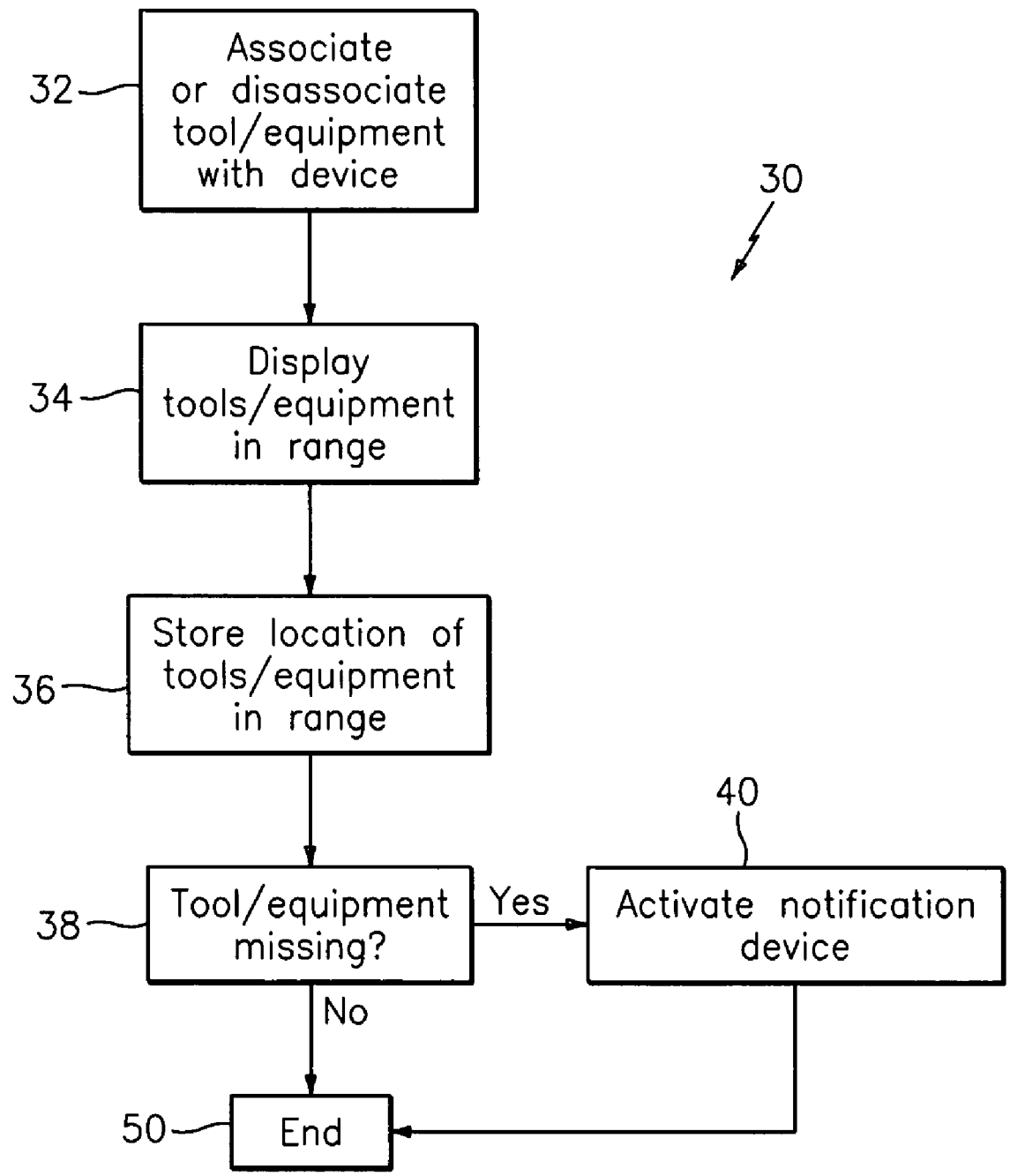
FIG. 3 illustrates a flowchart of an exemplary embodiment of a method for managing inventory.

Referring now to FIG. 3, a flowchart of an exemplary embodiment of a method for managing tool and equipment inventory is generally depicted as 30. In exemplary embodiments, a cable or telephone technician may use the device 10 for managing tool and equipment inventory in the field. As shown in process block 32, the technician may associate tools that are used for installations and repairs, which are intended to be retained by the technician, as well as pieces of equipment, such as cable boxes and modems, which are intended to be left at a job site. Prior to leaving to go into the field, the technician may use the device 10 for managing tool and equipment inventory to ensure that he has all of the necessary tools and equipment for the scheduled repairs and installations by instructing the device 10 to list all tools/equipment in range, as shown at process block 34. In exemplary embodiments, the display will not only display what tools/equipment are in range of the device 10, but it will also indicate the quantity of the tools/equipment detected. This function allows the technician to ensure that he has an adequate supply of the tools/equipment for the scheduled activities.

Once at a job site, the technician will be able to permanently dissociate a tool or piece of equipment that is going to be intentionally left at the job site, such as a modem or cable box. In exemplary embodiments, the device 10 for managing tool and equipment inventory may keep a log of dissociated tools and equipment, which may include the time and approximate location of the dissociation, as shown at process block 36. Additionally, upon leaving the job site, the device 10 for managing tool and equipment inventory will prevent the technician from accidentally leaving a tool or piece of equipment behind by using the notification device 22, as shown at process blocks 38 and 40, respectively.

In exemplary embodiments, the user interface 20 may include an option that allows a user to download or upload an inventory list to or from the device 10. For example, a technician may be able to upload an inventory list to the device 10 and then easily determine whether he has all of the necessary tools and equipment.

As described above, embodiments may be in the form of computer-implemented processes and apparatuses for practicing those processes. In exemplary embodiments, the invention is embodied in computer program code executed by one or more processors. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A computer program product for managing inventory, the computer program product comprising:

a storage medium readable by a processing circuit and storing instructions for execution by the processing circuit for facilitating a method comprising:

associating an inventory with a device for managing inventory comprising tools and equipment;

detecting the presence of the inventory within a specified range of the device for managing inventory;

alerting a user to the absence of the inventory within the specified range of the device for managing inventory; and displaying a menu of the device for managing inventory, the menu comprising an option to temporarily check out inventory;

wherein when the user prepares to go to field sites for scheduled repairs, the device is operative to associate the tools and equipment that will be required at the field sites;

wherein prior to leaving for the field sites, the device is operative to ensure that the user has the tools and equipment for scheduled repairs at the field sites;

wherein in response to the user of the device accidentally leaving tools and equipment at one of the field sites, the device is operative to notify the user;

wherein the tools and equipment are for making the scheduled repairs at the field sites;

wherein in response to the user intending to leave equipment being at least one of a communication box and a communication modem at one of the field sites, the device is operative to disassociate the at least one of the communication box and the communication modem from the inventory;

wherein the option to temporarily check out inventory via the menu is configured to allow the user to physically remove a selected inventory of the tools and equipment from the specified range of the device without alerting to the physical absence of the selected inventory;

wherein via the menu the device is configured to receive a selection of a duration that the selected inventory is being temporarily checked-out; and in response to the selected inventory not being returned to the specified range of the device for managing inventory before the duration has expired, alerting the user.

2. The computer program product of claim 1 comprising disassociating the inventory with the device for managing inventory.

3. The computer program product of claim 1, wherein alerting a user to the absence of the inventory is responsive to detecting the presence of the inventory within a specified range of the device for managing inventory.

4. The computer program product of claim 1, wherein the inventory includes tools and equipment.

5. A method for managing inventory implemented by a device for managing inventory comprising:

associating, by a device, an inventory with the device for managing inventory, the inventory comprising tools and equipment;

detecting, by the device, the presence of the inventory within a specified range of the device for managing inventory;

alerting, by the device, a user to the absence of the inventory within the specified range of the device for managing inventory; and displaying, by the device, a menu of the device for managing inventory, the menu comprising an option to temporarily check out inventory;

wherein when the user prepares to go to field sites for scheduled repairs, the device is operative to associate the tools and equipment that will be required at the field sites;

wherein prior to leaving for the field sites, the device is operative to ensure that the user has the tools and equipment for scheduled repairs at the field sites;

wherein in response to the user of the device accidentally leaving tools and equipment at one of the field sites, the device is operative to notify the user;

wherein the tools and equipment are for making the scheduled repairs at the field sites;

wherein in response to the user intending to leave equipment being at least one of a communication box and a communication modem at one of the field sites, the device is operative to disassociate the at least one of the communication box and the communication modem from the inventory;

wherein the option to temporarily check out inventory via the menu is configured to allow the user to physically remove a selected inventory of the tools and equipment from the specified range of the device without alerting to the physical absence of the selected inventory;

wherein via the menu the device is configured to receive a selection of a duration that the selected inventory is being temporarily checked-out; and in response to the selected inventory not being returned to the specified range of the device for managing inventory before the duration has expired, alerting the user.

6. The method of claim 5 comprising disassociating the inventory with the device for managing inventory.

7. The method of claim 5, wherein a user interface is utilized for associating the inventory with the device for managing inventory.

8. The method of claim 5, wherein a notification device is utilized for alerting the user to the absence of the inventory.

9. The method of claim 8, wherein the notification device is an audible alarm.

10. The method of claim 5, wherein the inventory includes tools and equipment.

* * * * *